April 21, 1942.   C. L. MEYERS   2,280,339
WOOD STAVE CONDUIT
Filed Oct. 9, 1940   2 Sheets-Sheet 1
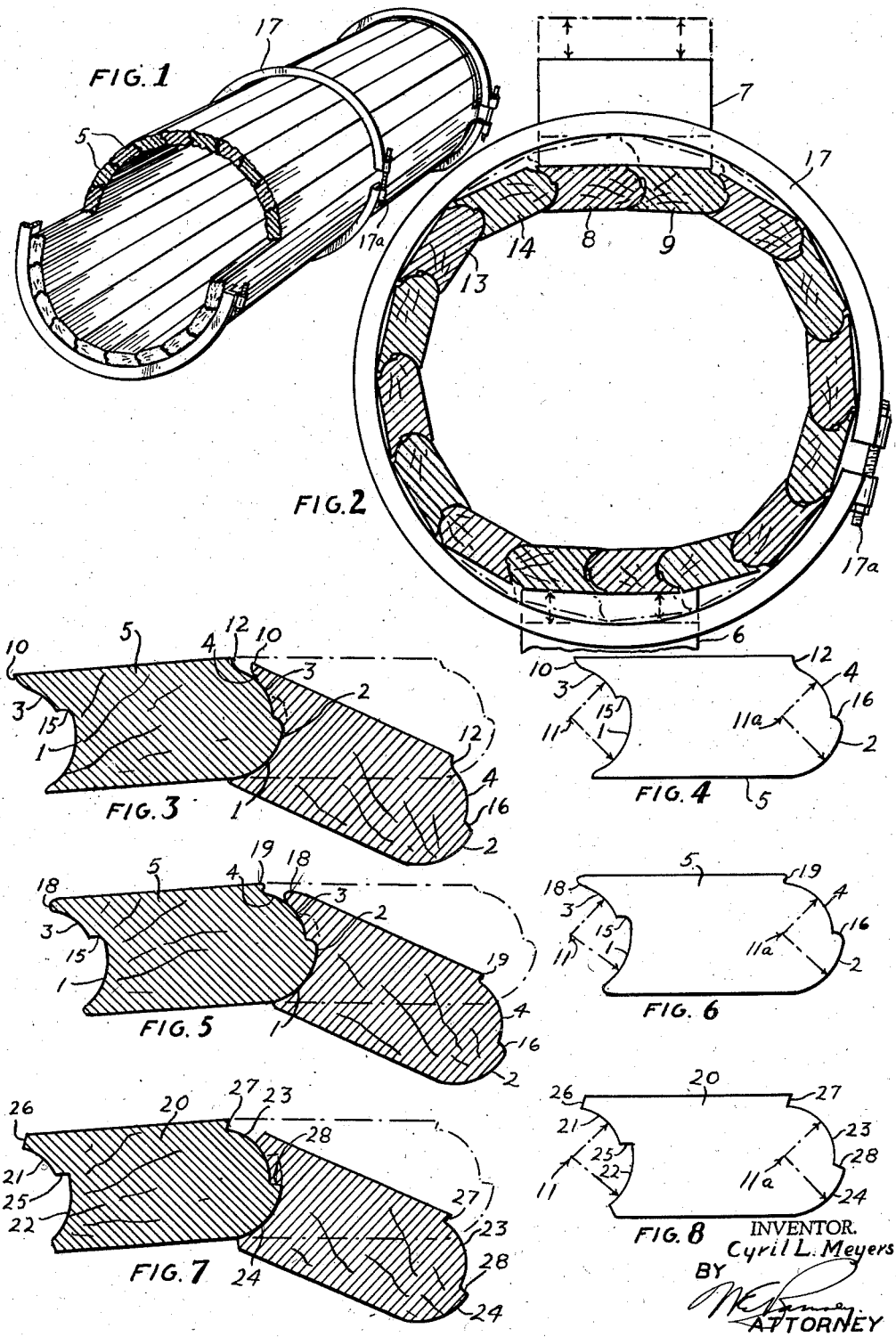
INVENTOR.
Cyril L. Meyers
BY
ATTORNEY

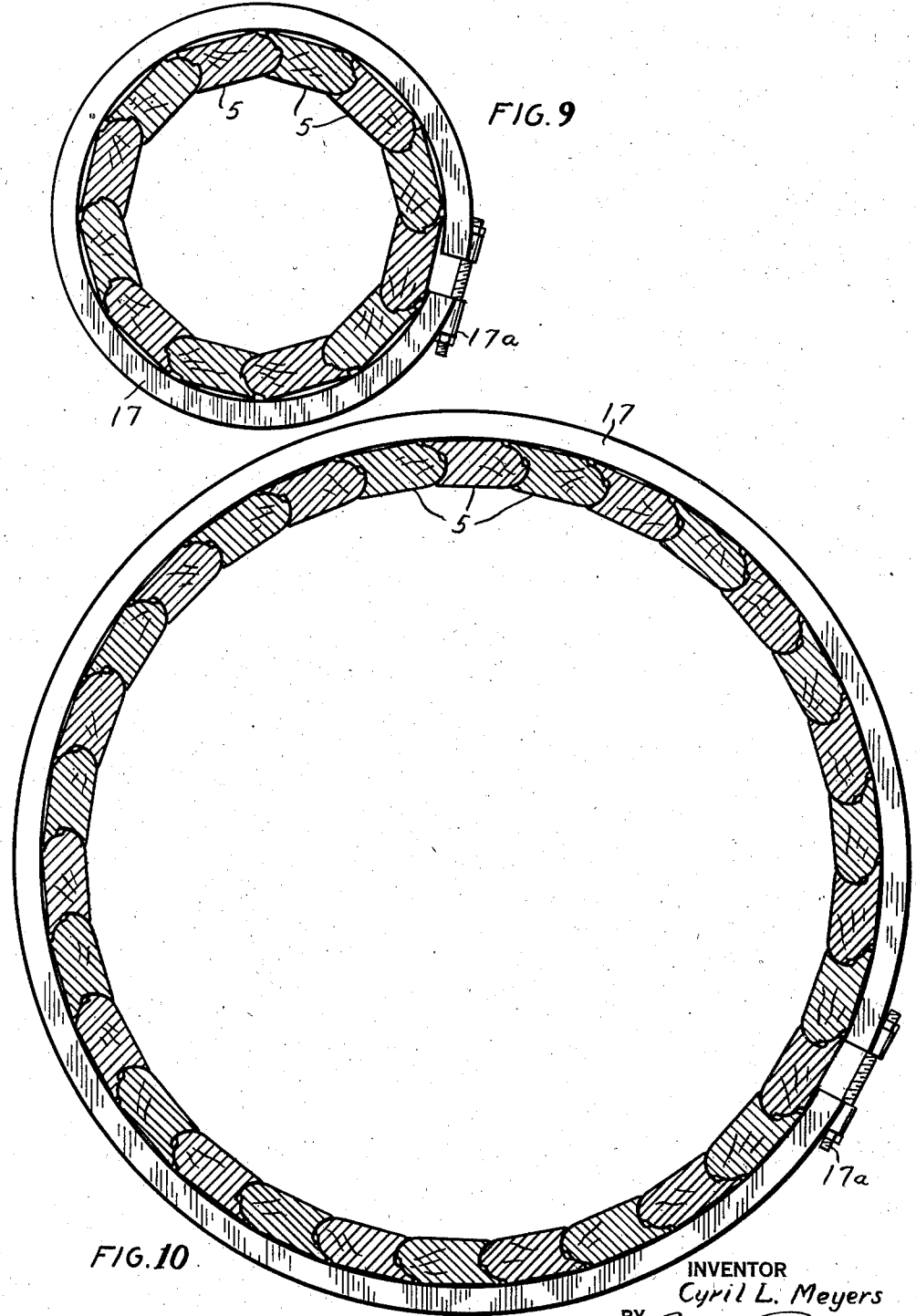

Patented Apr. 21, 1942

2,280,339

UNITED STATES PATENT OFFICE 2,280,339

WOOD STAVE CONDUIT

Cyril L. Meyers, Portland, Oreg., assignor to Forest Products Treating Division of Nebraska Bridge Supply & Lumber Company, a corporation of Nebraska Application October 9, 1940, Serial No. 360,449

4 Claims. (Cl. 138—79)

My invention relates to conduits comprising a plurality of longitudinally disposed abutting staves arranged in a circular course and held in said course by exteriorly arranged bands.

The principal object of my invention is to provide a conduit of this character made of staves so formed that a culvert formed thereof may deform slightly from said circular course without causing said conduit to collapse.

A further object of my invention is to provide a conduit of this character made of staves of uniform cross section whereby the conduit can be varied in diameter by increasing or decreasing the number of staves in each course.

To this end I provide individual staves for making up the conduit having marginal edges so formed that they may accommodate themselves to a conduit from twelve inches to forty-eight inches in diameter, the edges of each of said staves being formed so that they may have some limited articulation with the edges of the adjacent staves. Each stave is provided with one edge constituting a tongue section and the other edge a groove section. The tongue section of each stave is provided with two circularly formed tongues having a common center of radius, and the opposite edge with grooves complementary thereto. A shoulder is formed intermediate the faces of said stave edges so as to define a limiting stop for articulation in one direction, and on the edge of said stave adjacent the circularly formed tongue of lesser radius, a slight shoulder is formed to limit the articulation in the other direction.

Although my invention is useful wherever a wooden stave conduit is used, I deem it particularly useful for culverts, in which service heavy crushing loads may be imposed upon the conduit. The edges of the individual staves are formed to prevent leakage along said edges and yet to permit some substantial articulation while withstanding considerable crushing load. A conduit formed of staves embodying my invention distributes the forces exerted upon the conduit substantially uniformly over the abutting edges of the staves, thus avoiding excessive localized pressures upon said edges which would cause them to be crushed or to yield to such a degree so as to destroy the effectiveness of the arch structure of such a conduit in supporting a load.

The details of my invention and other features thereof are hereinafter described with reference to the accompanying drawings, in which:

Fig. 1 is a perspective view of one course of a conduit made of staves embodying my invention, a portion of said course being shown broken away to disclose details of construction of said staves;

Fig. 2 is an enlarged sectional view of said course as it appears when distorted by a heavy crushing load, which is shown diagrammatically;

Fig. 3 is an enlarged sectional view of two adjacent staves of the type illustrated in Figs. 1 and 2, one of said staves being shown in dot-and-dash lines to illustrate the degree of articulation permissible;

Fig. 4 is a diagrammatic view of one of said staves illustrating that the centers of curvature of the two circularly formed tongues and the two complementary grooves at the opposite edge lie upon common points;

Figs. 5 and 6 illustrate a modification of my invention similarly illustrated as in Figs. 3 and 4;

Figs. 7 and 8 show a further modification of staves embodying my invention similar in illustration as depicted in Figs. 3 and 4;

Fig. 9 is a sectional view of a conduit of minimum diameter formed of staves embodying my invention; and Fig. 10 is a sectional view of a larger conduit approaching the maximum diameter when such conduit is formed of staves embodying my invention.

A wood stave conduit embodying my invention comprises a plurality of longitudinally disposed staves 5, having a pair of circularly formed tongues 2 and 4 formed upon one edge thereof and complementary grooves 1 and 3 formed upon the other edge thereof. Said staves preferably are relatively flat and may be made of stock such as two-by-fours. That is, said staves may be made of wood two inches thick and four inches wide, although they are not limited to these dimensions. The tongue 2 occupies substantially one-half of the thickness of the stave, while the groove 1 occupies a greater proportion of the thickness so as to provide that degree of articulation shown in Fig. 3. The circularly formed tongue 4 occupies substantially the other half of the thickness, while the groove 3 with which it seats on an adjacent stave occupies the remainder of the thickness not occupied by groove 1. Each of said pairs of tongues and grooves are concentric, that is, the tongues 2 and 4 are concentric about the point 11a while the grooves 1 and 3 are concentric about the point 11, as is illustrated in Fig. 4. Thus if a section of conduit is considered supported by a base diagrammatically illustrated as 6 and is caused to support a weight diagrammatically illustrated as 7, said conduit is permitted to become distorted from a circular course to a flat, elliptical course as is illustrated in Fig. 2. The staves 8 and 9 and those diametrically opposite thereto are permitted to articulate to the degree of play introduced by the difference in width of the groove 3 as compared to the width of the tongue 4. In this way the conduit formed of staves embodying my invention may be distorted by such a heavy external load so that the staves directly beneath said superposed load may articulate to permit the conduit to become distorted from a circular course. It may be noted that the edges of each of the individual staves comprising said conduit remain in close contact with the abutting edges of the adjacent staves, whereas if said circular tongues and grooves were not concentric they would be forced apart by said distortion.

I prefer to maintain close contact between said circular portions for two reasons. First, there is less danger of the pipe leaking if there are large contact areas between the edges of the adjacent staves. Second, the pressure due to a load tending to crush the pipe is substantially uniform over a large area and crushing and yielding of small portions of the stave is thus avoided.

It is essential that there be some limits to articulation thus to prevent such stave moving rotatively to a point where any portion of the conduit has reverse curvature, because if such a point is reached the conduit at that point will tend to buckle, because I do not intend to have said staves supported interiorly. That is, referring to Fig. 2, where a section of conduit is shown supported by a block 6 having a relatively narrow surface and loaded by a weight diagrammatically indicated as 7, the pipe will be distorted so that the staves 8 and 9 will lie substantially in the same plane. This is the point where further distortion of the pipe will produce reverse curvature and buckling and thus further articulation must be restricted. To this end the tip portion 10, of the circularly formed groove 3 is formed into an eccentric arc of a circle, the center not being at the point 11. The outer wall of the tongue 4 is given a similar complementary curvature. Thus, further articulation of the staves 8 and 9 is resisted by the binding of said portions 10 and 12 when they are brought into abutment. Thus the abutment of portions 10 and 12 act as limiting factors to prevent further articulation of the edges of the staves when said staves have been forced nearly into the same plane by the weight 7.

It is desirable that the faces of the tip portion 10 and the eccentric portion 12 be of slight width so that, if the crushing strain becomes too severe so that the conduit collapses, the staves constituting the conduit will not be fractured and rendered unusable later. That is, if a section of conduit should buckle, either the slight eccentric portions 12 or the tips 10 will be crushed. This, however, does not prevent said conduit from being later reassembled from said staves, because said staves do not fracture through their middle portions, for example. It is desirable, therefore, that said portions 10 and 12 be limited more by friction as they approach their limit of articulation and articulation is inhibited by increased friction rather than by crushing or rupturing pressures.

When the parts are arranged as illustrated in Fig. 2, the staves 13 and 14, for example, are articulated to a curvature shorter than they normally occupy when their outer faces are in abutment with the encircling external ring 17. At this point the faces 15 and 16 of the groove and tongue edges, respectively, of the staves come into abutment. That is, staves 13 and 14 assume the position of the staves illustrated in Fig. 3. This defines the other limit of articulation and experience has proven that the staves 8 and 9 will buckle before the staves 13 and 14 are ruptured. Thus the faces 15 and 16 may be arranged substantially at the middle of the edges without subjecting the staves to rupturing strains which will fracture said staves.

It is a difficult matter to provide a stop on wood staves of this character which will prevent buckling, and the ability of a wood stave conduit of this character to resist crushing loads depends upon the maintenance of an arch structure immediately beneath the superposed load. Thus, if the wood along the abutting joints of staves 13 and 14 yields even slightly, the arch structure will spread to cause the arch to collapse. It follows that the articulated joint between staves 13 and 14 should have a good bearing surface, that is, the contact area should be large. Therefore, instead of providing a stop at the inside face of the joint between the abutting edges of staves 13 and 14 where it would be subjected to excessive pressure, I provide a stop substantially at the middle of said joint where it serves to prevent further articulation without being over-stressed.

In Figs. 5 and 6 I illustrate a stave of slightly different section embodying my invention, the main difference being in the formation of the uppermost edge of the groove 3 and the tongue section 4. For this reason I give similar letters of reference to the other parts illustrated in Figs. 5 and 6 as in Figs. 3 and 4. At the outer edge 18 of the groove 3 I form a relatively rounded lip and on the outer edge of the tongue 4 I provide a complementary groove 19 into which said lip 18 can seat when the staves are arranged in substantial alinement as the staves 8 and 9 are arranged in Fig. 2. This provides an engagement between the parts 18 and 19 rather than a frictional over-riding as in Fig. 3. The advantage of this structure is that a sharp edge is eliminated from the groove section 3, a similar fragile structure being provided on the outer edge of the groove 19 to permit said parts to "let go" if reverse curvature, or spreading of the arch, occurs as when the pipe collapses. The fragile edge of the groove 19 permits said parts to collapse before rupturing strains are set up in the main body of the staves which would cause them to be broken and no longer usable.

In Figs. 7 and 8 I show a still further modification of my invention. In said figures, staves 20 are provided with grooves 21 and 22 upon one edge and tongues 23 and 24 on the opposite edge. As in the previous modification, said tongues and grooves are formed about common centers so as to permit articulation, as is illustrated in dot-and-dash lines in Fig. 7. The face 25 separating groove 21 from groove 22 is straight, and the tip 26 of groove 21 is substantially normal to the tangent of said groove at the point where said tip joins said groove. The tongue 23 also terminates in a face 27 which is adapted to come into abutment with the tip 26 when two staves are arranged as are the staves 8 and 9 in Fig. 2. The face 28 is adapted to come into abutment with the face 25 of an adjacent stave when the parts are arranged as shown in Fig. 7, and thus limiting factors are provided for articulation between adjacent staves. In this modification the faces 28 and 27 are formed upon straight lines rather than upon curved lines as shown in Fig. 5, but their functions are substantially the same.

In Fig. 9 I illustrate how a relatively small diameter conduit can be formed of staves embodying my invention and in this view staves are illustrated as detailed in Figs. 3 and 4. When a conduit is made of said small diameter it is arranged so that the faces 15 and 16 are substantially in abutment and thus no articulation can take place to cause said staves to move inwardly so that they form sharper angles one with the other.

In Fig. 10 I illustrate a conduit of substantially larger diameter in which the staves are arranged so that the portions 10 and 12 of the abutting staves move into approximate abutment. I do not deem it practical to make a conduit of such large diameter that said portions 10 and 12 are actually in abutment, because then any deformations, such as is illustrated in Fig. 2, cannot take place without causing lips 10 and 12 to be crushed or otherwise broken, and thus I deem a conduit substantially as is illustrated in Fig. 10 to be the largest practical size to be made of staves proportioned and arranged as illustrated.

In forming a section of conduit with staves embodying my invention, I preferably tighten the encircling bands 17 so that the tongues and grooves of adjacent staves are seated tightly, one within the other. This is accomplished in the usual manner by threaded bolts 17a for said bands, or by turn-buckles or the like. I preferably provide a plurality of said encircling bands for each course, as is illustrated in Fig. 1, and preferably arrange said bands so that one is arranged at each end of a course, and thus sections can be joined end to end to produce a pipe of substantial length.

It will be understood that the word circular, as used herein, refers to portions of a circle rather than to an entire circle and that the edge of a stave is that side thereof that is in contact with the edge of an adjacent stave. That is, it is not essential that said staves have sections that are elongated, but I deem it preferable in order to produce proper articulation and efficient utilization of materials.

I claim:

1. In a conduit comprising a plurality of longitudinally disposed staves arranged in a circular course with their edges arranged in abutment with the edges of adjacent staves, said course being encircled by exteriorly arranged bands, each of said staves having a pair of circularly formed tongues formed upon one edge, and complementary grooves formed upon the other edge, said tongues and grooves on each of said edges, respectively, being concentric but having radii of different lengths.

2. In a conduit comprising a plurality of longitudinally disposed staves arranged in a circular course with their edges arranged in abutment with the edges of adjacent staves, said course being encircled by exteriorly arranged bands, each of said staves having a pair of circularly formed tongues formed upon one edge, and complementary grooves formed upon the other edge, said tongues and grooves on each of said edges, respectively, being concentric but having radii of different lengths, and being separated by a face arranged intermediate said tongues and grooves, respectively, and extending laterally to join the two circularly formed elements.

3. In a conduit comprising a plurality of longitudinally disposed staves arranged in a circular course with their edges arranged in abutment with the edges of adjacent staves, said course being encircled by exteriorly arranged bands, each of said staves having a pair of circularly formed tongues formed upon one edge, and complementary grooves formed upon the other edge, said tongues and grooves on each of said edges, respectively, being concentric but being of a different width, respectively, and having radii of different lengths, and being separated by a face arranged intermediate said tongues and grooves, respectively, and extending laterally to join the two circularly formed elements, the tongues and grooves, respectively, of smaller radius on said stave edges terminating on an eccentric shoulder whereby deformation of said conduit may be had within fixed limits from a circular section to a flattened elliptical section in which those staves lying adjacent the conjugate axis are arranged approximately in straight alinement without varying substantially the area of edge contact of said staves one with the adjacent one.

4. In a conduit comprising a plurality of longitudinally disposed staves arranged in a circular course with their edges arranged in abutment with the edges of adjacent staves, said course being encircled by exteriorly arranged bands, each of said staves having a pair of circularly formed tongues formed upon one edge, and complementary grooves formed upon the other edge, said tongues and grooves on each of said edges, respectively, being concentric but being of a different width, respectively, and having radii of different lengths, and being separated by a face arranged intermediate said tongues and grooves, respectively, and extending laterally to join the two circularly formed elements, the tongues and grooves, respectively, of smaller radius on said stave edges terminating in an eccentric shoulder of slight width whereby deformation of said conduit may be had within fixed limits from a circular section to a flattened elliptical section in which those staves lying adjacent the conjugate axis are arranged approximately in straight alinement without varying substantially the area of edge contact of said staves one with the adjacent one.

CYRIL L. MEYERS.